(12) United States Patent
Senmyo

(10) Patent No.: US 11,420,639 B2
(45) Date of Patent: Aug. 23, 2022

(54) DRIVING ASSISTANCE APPARATUS

(71) Applicant: SUBARU CORPORATION, Tokyo (JP)

(72) Inventor: Katsuo Senmyo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/155,311

(22) Filed: Jan. 22, 2021

(65) Prior Publication Data

US 2021/0261139 A1  Aug. 26, 2021

(30) Foreign Application Priority Data

Feb. 26, 2020 (JP) .............................. JP2020-030071
Sep. 4, 2020 (JP) .............................. JP2020-149259

(51) Int. Cl.
*B60W 40/09* (2012.01)
*B60W 50/14* (2020.01)
*B60W 40/08* (2012.01)

(52) U.S. Cl.
CPC ............ *B60W 40/09* (2013.01); *B60W 50/14* (2013.01); *B60W 2040/0827* (2013.01); *B60W 2040/0872* (2013.01)

(58) Field of Classification Search
CPC ................. B60W 40/09; B60W 50/14; B60W 2040/0827; B60W 2040/0872
See application file for complete search history.

(56) References Cited

U.S. PATENT DOCUMENTS

| 10,322,728 | B1* | 6/2019 | Porikli | G06K 9/6288 |
| 2003/0096593 | A1* | 5/2003 | Naboulsi | G08B 21/06 455/411 |
| 2006/0149428 | A1* | 7/2006 | Kim | B60W 40/09 701/1 |
| 2014/0297170 | A1 | 10/2014 | Sakima et al. | |
| 2015/0166058 | A1* | 6/2015 | Mizutani | B60W 40/02 701/1 |
| 2015/0283999 | A1* | 10/2015 | Igarashi | G08G 1/165 701/1 |
| 2020/0269848 | A1* | 8/2020 | Kang | B60W 60/0055 |

FOREIGN PATENT DOCUMENTS

JP  2014-191597 A  10/2014

* cited by examiner

*Primary Examiner* — Mohamed Barakat
(74) *Attorney, Agent, or Firm* — Troutman Pepper Hamilton Sanders LLP

(57) ABSTRACT

A driving assistance apparatus includes a risk prediction unit, a driving assistance control unit, a detection unit, and a first data storage. The risk prediction unit predicts a risk state of a vehicle on the basis of the vehicle's traveling state information and surrounding environment information. The driving assistance control unit executes driving assistance control on the basis of the predicted risk state. The detection unit acquires biological information of an occupant of the vehicle, and detects that the occupant feels danger on the basis of the biological information. The first data storage stores a learning model constructed by accumulating the vehicle's traveling state information and surrounding environment information obtained when the danger is felt. The driving assistance control unit executes the driving assistance control on the basis of the predicted risk state and the vehicle's traveling state information and surrounding environment information obtained when the danger is felt.

16 Claims, 8 Drawing Sheets

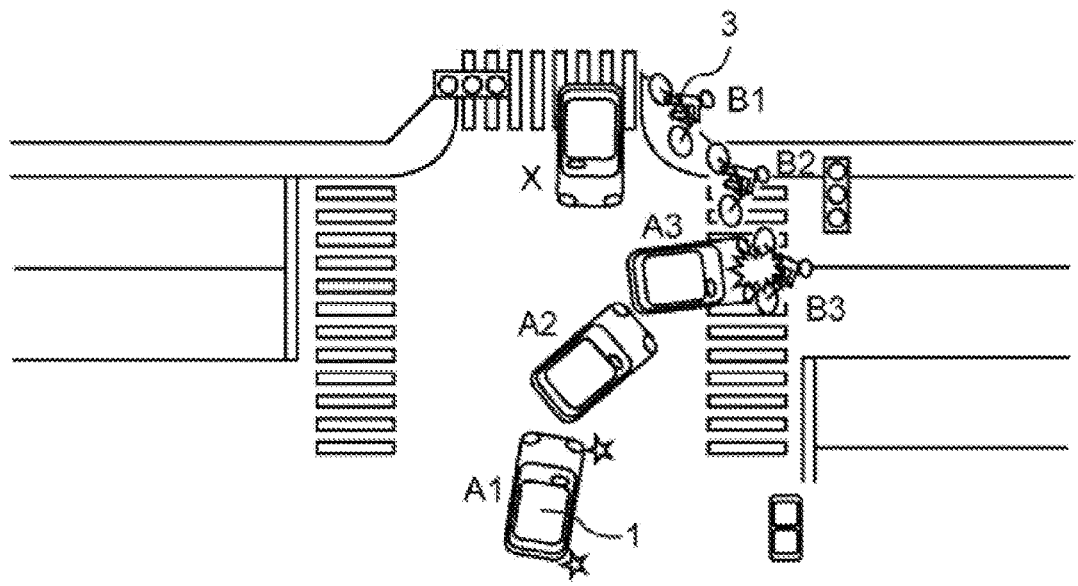

FIG. 4

| | | DRIVER'S FREQUENCY OF ENCOUNTERING NEAR-MISS INCIDENT | | |
|---|---|---|---|---|
| | | LOW | MIDDLE | HIGH |
| PROGRESSION OF DELAY IN DETERMINATION | A1 | NO ACTION | NO ACTION | SUGGESTION (VOICE PRESENTATION) |
| | A1 →A2 | SUGGESTION (VOICE PRESENTATION) | SUGGESTION (VOICE PRESENTATION) | INTERVENTION IN CONTROL (TORQUE REDUCTION) |
| | A2 →A3 | WARNING | INTERVENTION IN CONTROL (TORQUE REDUCTION) | INTERVENTION IN CONTROL (BRAKING) |
| | A3 | INTERVENTION IN CONTROL (BRAKING) | INTERVENTION IN CONTROL (BRAKING) | — |

FIG. 5

| | | RELATIVE EVALUATION BETWEEN RISK LEVEL EVALUATED BY VEHICLE AND RISK LEVEL RECOGNIZED BY DRIVER (COINCIDENCE) | | |
|---|---|---|---|---|
| | | DRIVER IS MORE SENSITIVE TO RISK | EQUIVALENT | DRIVER IS MORE INSENSITIVE TO RISK |
| PROGRESSION OF DELAY IN DETERMINATION | A1 | NO ACTION | NO ACTION | SUGGESTION (VOICE PRESENTATION) |
| | A1 →A2 | SUGGESTION (VOICE PRESENTATION) | SUGGESTION (VOICE PRESENTATION) | INTERVENTION IN CONTROL (TORQUE REDUCTION) |
| | A2 →A3 | WARNING | INTERVENTION IN CONTROL (TORQUE REDUCTION) | INTERVENTION IN CONTROL (BRAKING) |
| | A3 | INTERVENTION IN CONTROL (BRAKING) | INTERVENTION IN CONTROL (BRAKING) | — |

FIG. 6

| | | DEPENDENCE OF DRIVER ON WARNING AND INTERVENTION IN CONTROL | | |
|---|---|---|---|---|
| | | LOW | MIDDLE | HIGH |
| PROGRESSION OF DELAY IN DETERMINATION | A1 | NO ACTION | NO ACTION | SUGGESTION (VOICE PRESENTATION) |
| | A1 →A2 | SUGGESTION (VOICE PRESENTATION) | SUGGESTION (VOICE PRESENTATION) | INTERVENTION IN CONTROL (TORQUE REDUCTION) |
| | A2 →A3 | WARNING | INTERVENTION IN CONTROL (TORQUE REDUCTION) | INTERVENTION IN CONTROL (BRAKING) |
| | A3 | INTERVENTION IN CONTROL (BRAKING) | INTERVENTION IN CONTROL (BRAKING) | — |

FIG. 7

DRIVING ASSISTANCE APPARATUS

CROSS-REFERENCE TO RELATED APPLICATIONS

The present application claims priority from Japanese Patent Application Nos. 2020-30071 filed on Feb. 26, 2020, and 2020-149259 filed on Sep. 4, 2020, the entire contents of each of which are hereby incorporated by reference.

BACKGROUND

The technology relates to a driving assistance apparatus.

It has been found that a traffic accident is often caused by erroneous determination made by a driver, as well as a delay in timing of finding a risk state. Whether the driver is able to make appropriate determination depends on the driver's skill. However, in recent years, driving assistance apparatuses have been put to practical use to cause a vehicle to travel appropriately regardless of a driver's skill. For example, Japanese Unexamined Patent Application Publication No. 2014-191597 discloses a driving assistance apparatus that evaluates a positional relationship between the own vehicle and a target, such as a person or another vehicle, on the basis of motion of the own vehicle and the target detected by a camera or a radar, for example, predicts collision or contact, and performs warning or intervention in traveling control. This driving assistance apparatus determines collision risk between the own vehicle and the target, on the basis of a position and a predicted course of the target, and performs driving assistance for collision avoidance in a case where the collision risk is high.

SUMMARY

An aspect of the technology provides a driving assistance apparatus including a risk prediction unit, a driving assistance control unit, a detection unit, and a first data storage. The risk prediction unit is configured to predict a risk state of a vehicle on the basis of traveling state information of the vehicle and surrounding environment information of the vehicle. The driving assistance control unit is configured to execute driving assistance control on the basis of the risk state predicted by the risk prediction unit. The detection unit is configured to acquire biological information of an occupant of the vehicle, and detect that the occupant feels danger on the basis of the biological information. The first data storage is configured to store a learning model constructed by accumulating the traveling state information of the vehicle and the surrounding environment information of the vehicle each obtained when the occupant feels the danger. The driving assistance control unit is configured to execute the driving assistance control on the basis of, together with the predicted risk state, the traveling state information of the vehicle and the surrounding environment information of the vehicle each obtained when the occupant feels the danger.

An aspect of the technology provides a driving assistance apparatus including circuitry and a first data storage. The circuitry is configured to predict a risk state of a vehicle on the basis of traveling state information of the vehicle and surrounding environment information of the vehicle, execute driving assistance control on the basis of the predicted risk state, acquire biological information of an occupant of the vehicle, and detect that the occupant feels danger on the basis of the biological information. The first data storage is configured to store a learning model constructed by accumulating the traveling state information of the vehicle and the surrounding environment information of the vehicle each obtained when the occupant feels the danger. The circuitry is configured to execute the driving assistance control on the basis of, together with the predicted risk state, the traveling state information of the vehicle and the surrounding environment information of the vehicle each obtained when the occupant feels the danger.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 4 is an explanatory diagram illustrating a collision instance of a vehicle.

FIG. 5 is an explanatory diagram illustrating an example setting of warning and vehicle control.

FIG. 6 is an explanatory diagram illustrating another example setting of warning and vehicle control.

FIG. 7 is an explanatory diagram illustrating still another example setting of warning and vehicle control.

DETAILED DESCRIPTION

In a case where a plurality of targets is present in a given traffic situation, smooth traveling can be hindered by executing warning or intervention in traveling control after collision or contact predicted on the basis of individual positional relationships becomes certain.

It is desirable to provide a driving assistance apparatus that is able to execute a warning action or an action of intervening in traveling control, without hindering smooth traveling, even in a case where a plurality of targets is present.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

[1. Example Configuration of Driving Assistance Apparatus]

Figure 1:
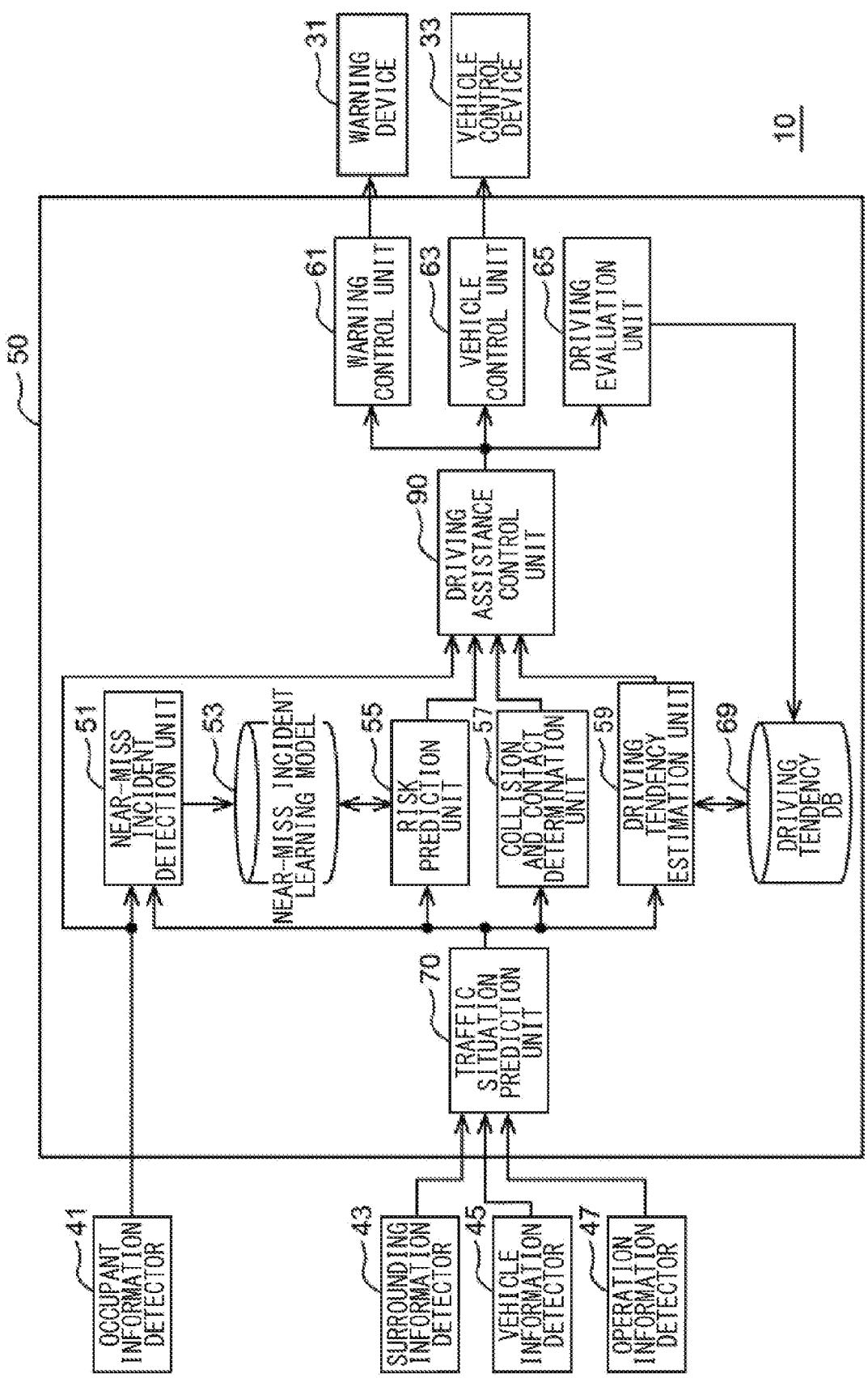
FIG. 1 is a block diagram illustrating an example configuration of a driving assistance apparatus according to one example embodiment of the technology.

Described first is an example configuration of a driving assistance apparatus according to an example embodiment of the technology. FIG. 1 is a block diagram illustrating an example configuration of a driving assistance apparatus 10 according to an example embodiment of the technology.

The driving assistance apparatus 10 may be mounted in a vehicle. The driving assistance apparatus 10 may detect an occupant in the vehicle and a traveling state and an operation state of the vehicle, and acquire information on a surrounding environment (hereinafter also referred to as surrounding environment information) of the vehicle. On the basis of the various pieces of information acquired, the driving assistance apparatus 10 may execute driving assistance control of the vehicle. The driving assistance apparatus 10 may include an occupant information detector 41, a surrounding information detector 43, a vehicle information detector 45, an operation information detector 47, an electronic control device 50, a warning device 31, and a vehicle control device 33.

[1-1. Occupant Information Detector]

The occupant information detector 41 may acquire information on a driver, an occupant, and a passenger in the vehicle. The occupant information detector 41 may include one or more detection devices that acquire information to be used to estimate an emotion or sensitivity of the occupant. The electronic control device 50 may receive the information acquired by the occupant information detector 41.

The occupant information detector 41 may include one or more of the following devices: a camera detecting a heart rate or temperature, for example, of the occupant on the basis of a captured image, a Doppler sensor detecting the heart rate of the occupant using an electromagnetic wave, a non-contact pulse sensor detecting the pulse rate of the occupant, an electrode embedded in the steering wheel to measure the heart rate or electrocardiogram of the driver, a pressure instrument embedded in the driver's seat to measure the sitting pressure distribution while the occupant is seated on the seat, a device detecting a change in the position of the seatbelt to measure the heart rate or breathing of the occupant, a time of flight (TOF) sensor acquiring information on the position (biological position) of the occupant, and a thermographic device measuring the skin surface temperature of the occupant. The occupant information detector 41 may further include a mountable detector such as a wearable device acquiring the biological information of the occupant while being mounted on the occupant.

[1-2. Surrounding Information Detector]

The surrounding information detector 43 may acquire the surrounding environment information of the vehicle. The surrounding information detector 43 may detect a person, another vehicle, a bicycle, and other obstacles present around the vehicle, to acquire the surrounding environment information of the vehicle. The electronic control device 50 may receive the information acquired by the surrounding information detector 43. For example, the surrounding information detector 43 may include one or more of the following devices: a camera that captures an image of the surrounding environment of the vehicle, a radar that detects an object present around the vehicle, and a detector, such as a LiDAR, that detects a distance or azimuth to an object present around the vehicle. The surrounding information detector 43 may further include a communication device that acquires information from a device outside the vehicle via a vehicle-to-vehicle communication or a road-to-vehicle communication, for example. The surrounding information detector 43 may further include a detector that acquires information relevant to road surface friction.

[1-3. Vehicle Information Detector]

The vehicle information detector 45 may acquire information on a traveling state (hereinafter also referred to as traveling state information) of the vehicle. The vehicle information detector 45 may acquire the traveling state information of the vehicle, such as a vehicle speed, an acceleration rate, or a yaw rate. The electronic control device 50 may receive the information acquired by the vehicle information detector 45. For example, the vehicle information detector 45 may include one or more of a vehicle speed sensor, an acceleration sensor, and an angular speed sensor.

[1-4. Operation Information Detector]

The operation information detector 47 may acquire information on a driving operation state (hereinafter also referred to as operation state information) of the vehicle. The operation information detector 47 may acquire the operation state information of the vehicle, such as an acceleration operation amount, a brake operation amount, or a steering rudder angle. The electronic control device 50 may receive the information acquired by the operation information detector 47. For example, the operation information detector 47 may include one or more of an accelerator position sensor, a brake stroke sensor, and a rudder angle sensor.

[1-5. Warning Device]

The warning device 31 may be controlled by the electronic control device 50 to perform a warning action as one example of driving assistance control. For example, the warning device 31 may be a display that displays a warning, a speaker that outputs warning sound or warning voice, or a warning lamp that issues a warning by light emission. Examples of the display may include a display panel provided on a dashboard, a head-up display (HUD) that projects an image on a windshield, a meter display on an instrument panel, a display of a navigation system, and a multi-function display that presents various pieces of information.

[1-6. Vehicle Control Device]

The vehicle control device 33 may be controlled by the electronic control device 50 to perform automatic driving control as one example of the driving assistance control. The vehicle control device 33 may include one or more controllers that control the travel of the vehicle. For example, the vehicle control device 33 may include a controller that controls driving of an engine, a power transmission mechanism including one or more drive motors and a transmission, a steering system, and a brake system. The vehicle control device 33 may, for example, control the travel of the vehicle on the basis of a driving operation performed by the driver. The vehicle control device 33 may execute the driving assistance control in response to a command from the electronic control device 50.

[1-7. Electronic Control Device]

The electronic control device 50 may include an arithmetic processing unit, such as a central processing unit (CPU) or a micro-processing unit (MPU), and a memory, such as a random access memory (RAM) or a read only memory (ROM), for example. The arithmetic processing unit may execute programs stored in the memory to conduct various kinds of calculation processes. In addition to or in place of the memory, the electronic control device 50 may include a storage medium, such as a hard disk drive (HDD), a compact disc (CD), a digital versatile disc (DVD), a solid state drive (SSD), a universal serial bus (USB) flash drive, or a storage device. Note that a portion or the entirety of the electronic control device 50 may be an updatable software such as a firmware, or a program module to be executed in response to a command from the CPU, for example.

The electronic control device 50 may be coupled to the occupant information detector 41, the surrounding information detector 43, the vehicle information detector 45, the operation information detector 47, the warning device 31, and the vehicle control device 33 in a direct manner or in an indirect manner via a control unit area network (CAN) or a local interconnect network (LIN), for example.

In the example embodiment, the electronic control device 50 may include a traffic situation prediction unit 70, a near-miss incident detection unit 51, a risk prediction unit 55, a collision and contact determination unit 57, a driving tendency estimation unit 59, a driving assistance control unit 90, a warning control unit 61, a vehicle control unit 63, and a driving evaluation unit 65. These units included in the electronic control device 50 may be implemented by programs executed by the arithmetic processing unit.

[1-7-1. Traffic Situation Prediction Unit]

The traffic situation prediction unit 70 may predict a traffic situation where the vehicle is to be placed, on the basis of the information transmitted from the surrounding information detector 43, the vehicle information detector 45, and the operation information detector 47. For example, the traffic situation prediction unit 70 may predict the traffic situation where the own vehicle is to be placed, on the basis of at least the traveling state and the operation state of the own vehicle and a state of a traffic environment and a traffic participant around the own vehicle.

Figure 2:
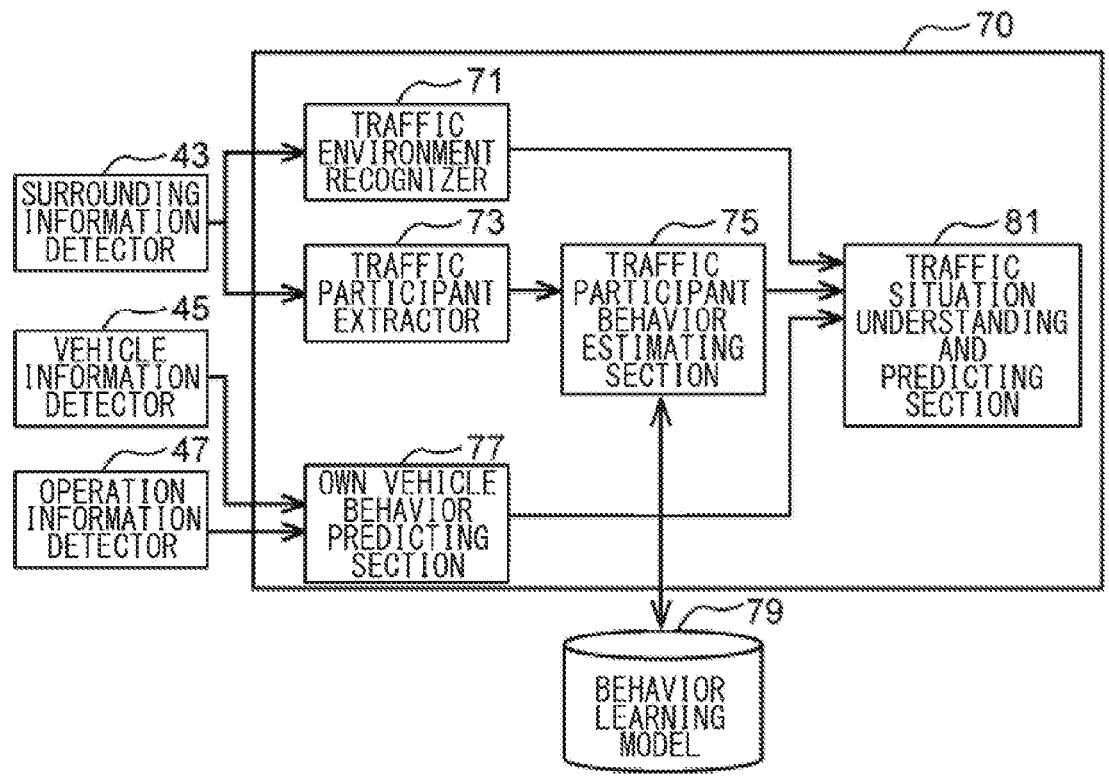
FIG. 2 is a block diagram illustrating an example configuration of a traffic situation prediction unit.

FIG. 2 is a block diagram illustrating an example configuration of the traffic situation prediction unit 70. The traffic situation prediction unit 70 may include a traffic environment recognizer 71, a traffic participant extractor 73, a traffic participant behavior estimating section 75, an own vehicle behavior predicting section 77, and a traffic situation understanding and predicting section 81. The traffic situation prediction unit 70 may be configured to refer to a behavior learning model 79.

The traffic environment recognizer 71 may obtain information on the traffic environment around the vehicle, on the basis of the information transmitted from the surrounding information detector 43. In one example, the traffic environment recognizer 71 may perform image processing on an image captured by a camera, or perform arithmetic processing using data detected by a radar or a LiDAR, for example. The traffic environment recognizer 71 may thus recognize a traffic light, a traffic sign, a lane line on a road, a building, and an obstacle, such as a guardrail or a curb, present around the own vehicle. The traffic environment recognizer 71 may obtain information such as a size of a recognized target, a distance to the target, or a relative speed with respect to the target. The traffic environment recognizer 71 may also obtain information on a color of the traffic light.

The traffic participant extractor 73 may extract the traffic participant around the vehicle, on the basis of the information transmitted from the surrounding information detector 43. In one example, the traffic participant extractor 73 may extract a plurality of traffic participants, such as another vehicle, a bicycle, or a pedestrian, present around the own vehicle. The traffic participant extractor 73 may obtain information such as a distance to each of the extracted traffic participants or a relative speed with respect to the traffic participant.

The traffic participant behavior estimating section 75 may estimate a behavior of the traffic participant extracted by the traffic participant extractor 73. In one example, the traffic participant behavior estimating section 75 may input the information on the traffic participant extracted by the traffic participant extractor 73 to the behavior learning model 79, and estimate the behavior to be exhibited by each traffic participant on the basis of an output from the behavior learning model 79. This enables estimation of what kind of motion the traffic participant is to make. The behavior learning model 79 may be, for example, a learning model constructed by learning behaviors of traffic participants, such as another vehicle, a bicycle, or a pedestrian, in various traffic situations. The behavior learning model 79 may be stored in a storage device or a storage medium in advance. In this case, the storage device or the storage medium may serve as a behavior data storage. The behavior learning model 79 may be updated sequentially with the information acquired by the traffic situation prediction unit 70.

The own vehicle behavior predicting section 77 may predict a behavior of the own vehicle, on the basis of the information transmitted from the vehicle information detector 45 and the operation information detector 47. In one example, the own vehicle behavior predicting section 77 may predict the behavior of the own vehicle, on the basis of the current traveling state of the vehicle detected by the vehicle information detector 45 and the driving operation state of the vehicle detected by the operation information detector 47.

The traffic situation understanding and predicting section 81 may understand the current traffic situation where the own vehicle is placed, and predict the traffic situation where the own vehicle is to be placed, on the basis of the information obtained by the traffic environment recognizer 71, the traffic participant behavior estimating section 75, and the own vehicle behavior predicting section 77. In one example, the traffic situation understanding and predicting section 81 may understand and predict the traffic situation of the own vehicle by taking into consideration the behavior of the traffic participant and the behavior of the own vehicle, in addition to the traffic environment around the own vehicle. In this manner, the traffic situation prediction unit 70 may predict the traffic situation where the own vehicle is to be placed.

[1-7-2. Collision and Contact Determination Unit]

The collision and contact determination unit 57 may determine whether collision or contact between the own vehicle and another traffic participant occurs, on the basis of the information on the current traffic situation of the own vehicle predicted by the traffic situation prediction unit 70. The collision and contact determination unit 57 may determine collision, for example, on the basis of a physical model. For example, the collision and contact determination unit 57 may determine whether a path of a course to be taken by the traffic participant and a path of a course to be taken by the own vehicle meet each other, on the basis of the current traffic environment, the predicted behavior of the traffic participant, and the predicted behavior of the own vehicle. The determination of collision, for example, between the own vehicle and another traffic participant by the collision and contact determination unit 57 may result in a determination result not mainly taking a skill of each driver into consideration.

[1-7-3. Near-Miss Incident Detector]

The near-miss incident detection unit 51 detects a near-miss incident indicating a state in which the occupant has felt danger, on the basis of the information transmitted from the occupant information detector 41. In one example, the near-miss incident detection unit 51 may detect the near-miss incident, on the basis of a change in the occupant's facial expressions, face direction, line of sight, pulse rate, heart rate, blood pressure, or electrocardiogram, for example, detected by the occupant information detector 41. In one embodiment, the near-miss incident detection unit 51 may serve as a "detection unit".

For example, the near-miss incident detection unit 51 may detect the near-miss incident, in a case where an abrupt change occurs in the pulse rate, heart rate, blood pressure, or electrocardiogram, for example, in a state of having detected that the occupant is looking outside the vehicle on the basis of the information on the face direction and line of sight. This makes it possible to enhance a degree of certainty that the detected state is a state in which the occupant has felt danger about the traffic situation outside the vehicle. In another example, the near-miss incident detection unit 51 may detect the near-miss incident in a case where an abrupt change occurs in the pulse rate, heart rate, blood pressure, or electrocardiogram, for example, upon detecting that the occupant has returned from a looking-aside state to a state of a proper line of sight, after detecting that the occupant is looking aside on the basis of the information on the face direction and line of sight. A threshold of a change rate of the pulse rate, heart rate, blood pressure, or electrocardiogram, for example, in determining that the occupant has felt danger may be set to an appropriate value in advance. Levels of near-miss incidents may be classified according to the change rate of the pulse rate, heart rate, blood pressure, or electrocardiogram, for example. Note that a method of detecting the near-miss incident is not limited to the example described above.

The near-miss incident detection unit 51 may acquire the information on the current traffic situation of the own vehicle predicted by the traffic situation prediction unit 70, and cause a near-miss incident learning model 53 to learn sequentially by accumulating information on the own vehicle's traffic situation where the near-miss incident has been detected. The near-miss incident learning model 53 is a learning model constructed by learning data on the traffic situation where the near-miss incident has been detected, i.e., data on the traffic situation where the occupant has felt danger. Examples of a mathematical model to be used to construct the near-miss incident learning model 53 may include a classifier that classifies inputted data on the basis of a tag or teacher data, a support vector machine, a neighborhood method, a neural network such as deep learning, or a known model such as a Bayesian network. The near-miss incident learning model 53 may be stored in a storage device or a storage medium. In this case, the storage device or the storage medium may serve as a near-miss incident data storage. In one embodiment, the storage device or the storage medium may serve as a "first data storage".

The "near-miss incident" may refer to a state in which an event has been recognized that is one step away from a serious disaster or accident and likely to directly lead to a serious disaster or accident. The occupant to be a target of detection of the near-miss incident is not limited to the driver, and may include a passenger.

[1-7-4. Risk Prediction Unit]

The risk prediction unit 55 predicts a risk state of the own vehicle on the basis of the traffic situation predicted by the traffic situation prediction unit 70, by using the near-miss incident learning model 53 that has accumulated and learned data. For example, the risk prediction unit 55 may be configured to predict whether risk is approaching in the current traffic situation, by using the near-miss incident learning model 53 constructed by learning instances of traffic situations where the occupant of the vehicle has felt danger in the past.

In one example, the risk prediction unit 55 may input data indicating the traveling state information and the surrounding environment information of the vehicle to the near-miss incident learning model 53, and predict the risk state of the own vehicle on the basis of an outputted near-miss incident state. In a case where the output from the near-miss incident learning model 53 indicates that a near-miss incident has been detected in the past, the risk prediction unit 55 may predict that the predicted traffic situation is a state involving a risk for the own vehicle. In a case where the near-miss incident learning model 53 has learned data on levels of near-miss incidents, the risk prediction unit 55 may predict a level of the risk involved for the own vehicle on the basis of the level of the near-miss incident.

For example, the information on the vehicle traveling state serving as the input data may include data on acceleration rates of the vehicle in frontward, rearward, rightward, leftward, upward, and downward directions, a yaw angular speed, a pitch angular speed, a roll angular speed, a vehicle speed, and a steering angle. The information on the vehicle traveling state may further include information on the engine revolution number and an output of a turn signal lamp, for example. The surrounding environment information of the vehicle serving as the input data may include data on: the lane on which the own vehicle is traveling; the relative distance, relative speed, and advancing direction of a traffic participant such as another vehicle or a pedestrian; and the number of lanes and traffic light information of the road on which the own vehicle is traveling. The surrounding environment information of the vehicle may further include information on the weather and the state of a road, for example.

The collision and contact determination unit 57 described above may determine occurrence of collision, for example, on the basis of the physical model. In contrast, the risk prediction unit 55 may objectively predict the risk state of the vehicle from the current traffic situation, on the basis of instances where the occupant of the vehicle has actually felt danger in the past. This makes it possible to recognize that collision, for example, is likely to occur if the vehicle keeps traveling, even at a point in time when the degree of certainty of the determination by the collision and contact determination unit 57 that collision, for example, occurs is low.

[1-7-5. Driving Tendency Estimation Unit]

The driving tendency estimation unit 59 may estimate a driving tendency of the driver in the current traffic situation where the own vehicle is placed, on the basis of the information on the current traffic situation of the own vehicle predicted by the traffic situation prediction unit 70. In one example, the driving tendency estimation unit 59 may refer to a driving tendency database (DB) 69 including accumulated data, and estimate how often the driver has felt danger in the past in the current traffic situation or dependence of the driver on the driving assistance control, for example. The driving tendency database 69 may be a database containing, as accumulated information on each driver, the traffic situation where a state in which the driver feels danger has been detected in the past, a risk level in that case, and information on the actual driving operation performed by the driver in a case where the driving assistance control has been executed. The driving tendency database 69 may be stored in a storage device or a storage medium. In this case, the storage device or the storage medium may serve as a driving tendency data storage. In one embodiment, the storage device or the storage medium may serve as a "second data storage". The driving tendency database 69 may contain information on a driving skill of each driver. Using a result of estimating the driving tendency of each driver for the driving assistance control makes it possible to change a degree of intervention of the driving assistance control depending on the driving tendency of the driver.

[1-7-6. Driving Assistance Control Unit]

The driving assistance control unit 90 executes predetermined driving assistance control, on the basis of the information transmitted from the occupant information detector 41, and the information obtained by the risk prediction unit 55, the collision and contact determination unit 57, and the driving tendency estimation unit 59. In the example embodiment, the driving assistance control unit 90 may calculate information on operation commands for the warning control unit 61 and the vehicle control unit 63.

Figure 3:
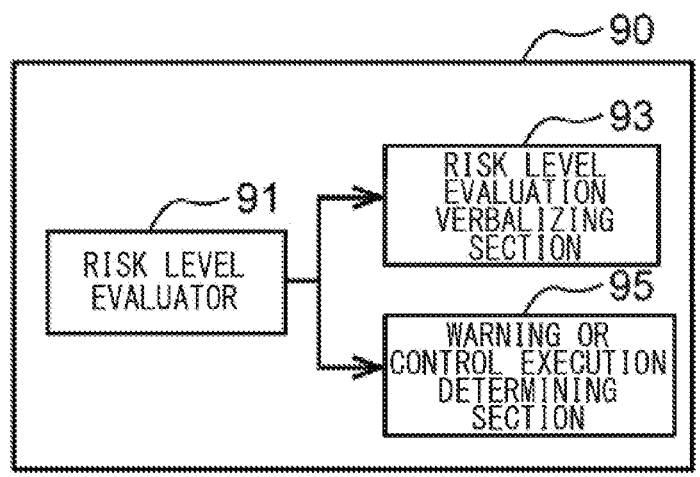
FIG. 3 is a block diagram illustrating an example configuration of a driving assistance control unit.

FIG. 3 is a block diagram illustrating an example configuration of the driving assistance control unit 90. The driving assistance control unit 90 may include a risk level evaluator 91, a risk level evaluation verbalizing section 93, and a warning or control execution determining section 95.

The risk level evaluator 91 may comprehensively evaluate a risk level of the own vehicle, on the basis of the risk state prediction result obtained by the collision and contact determination unit 57 and based on the physical model, and the risk state prediction result obtained by the risk prediction unit 55 and based on the near-miss incident learning model. For example, the risk level evaluator 91 may convert, into numbers, the degrees of certainty of the risk states of the risk state prediction result obtained by the collision and contact determination unit 57 and the risk state prediction result obtained by the risk prediction unit 55, and regard the larger one of the numbers as the risk level. Alternatively, the risk level evaluator 91 may convert, into numbers, the degrees of certainty of the risk states of the risk state prediction result obtained by the collision and contact determination unit 57 and the risk state prediction result obtained by the risk prediction unit 55, and regard the sum of the numbers as the risk level.

In evaluating the risk level, the risk level evaluator 91 may weight each of the risk state prediction result obtained by the collision and contact determination unit 57 and the risk state prediction result obtained by the risk prediction unit 55. The risk level evaluator 91 may weight the risk level on the basis of the predicted risk state. For example, the risk level may be weighted on the basis of whether the predicted risk state is collision between vehicles or collision between the vehicle and a pedestrian or a bicycle, whether the predicted risk state is front collision or minor contact, or a relative speed between the own vehicle and a vehicle, a pedestrian, or a bicycle with which the own vehicle has collided.

The risk level evaluation verbalizing section 93 may perform verbalization for warning issuance to the occupant including the driver. For example, on the basis of the risk level evaluation result, the risk level evaluation verbalizing section 93 may put into words information such as what kind of risk state the vehicle is placed in, a target to which attention is to be given, or a direction in which attention is to be given. The verbalized information may be transmitted to the warning control unit 61 to be used for the warning action, such as outputting warning voice or displaying a warning.

The warning or control execution determining section 95 may determine whether control is to be executed by the warning control unit 61 and the vehicle control unit 63, on the basis of the risk level evaluation result. In the example embodiment, the warning or control execution determining section 95 may vary settings of the warning action or the action of intervening in vehicle control, on the basis of elapsed time from a time when a risk state, such as collision, of the vehicle is predicted. In one example, whether the control is to be executed may be determined such that only warning is executed in an initial stage where collision, for example, of the vehicle has been detected, and the degree of intervention in the vehicle control increases as a delay in determination by the driver progresses.

In the example embodiment, the warning or control execution determining section 95 may vary the settings of the warning action or the action of intervening in the vehicle control depending on the driving tendency of the driver. In one example, whether the control is to be executed may be determined such that the degree of intervention in the vehicle control increases with a decrease in the driving skill of the driver or an increase in the dependence on the driving assistance control. Alternatively, whether the control is to be executed may be determined such that timing of executing the driving assistance control becomes earlier with a decrease in the driving skill of the driver or an increase in the dependence on the driving assistance control.

The warning or control execution determining section 95 may determine that only the warning control is to be executed, without execution of the intervention in the vehicle control, in a case where the risk level is relatively low, or in a case where damage due to collision is estimated to be small. The warning or control execution determining section 95 may determine that the intervention in the vehicle control is to be executed together with the warning control, in a case where the risk level is high, or in a case where damage due to collision is estimated to be large.

[1-7-7. Warning Control Unit]

The warning control unit 61 may generate a control signal for the warning device 31, on the basis of a result of the determination by the warning or control execution determining section 95. In a case of causing the warning device 31 to execute the warning action, the warning control unit 61 may generate a control signal that causes the warning device 31 to perform a predetermined warning action, and output the control signal to the warning device 31. This makes it possible to prompt the driver to perform a driving operation of avoiding the risk state of the vehicle, which makes it possible to avoid the risk state, such as collision, of the vehicle and reduce damage. In a case of causing the warning device 31 to perform the warning action by outputting voice or displaying text, the warning control unit 61 may output the verbalized information generated by the risk level evaluation verbalizing section 93 to the warning device 31. This enables the warning device 31 to perform the warning action by outputting voice or displaying text.

[1-7-8. Vehicle Control Unit]

The vehicle control unit 63 may generate a control signal for the vehicle control device 33, on the basis of the result of the determination by the warning or control execution determining section 95. In a case where a risk state, such as collision, of the vehicle is predicted, the vehicle control unit 63 may cause a portion or the entirety of the vehicle to be automatically driven to avoid the risk state or reduce damage. For example, the vehicle control unit 63 may generate a control signal that causes the vehicle to decelerate, brake suddenly, or make a turn, and output the control signal to the vehicle control device 33. This causes the vehicle to make a motion of avoiding collision, making it possible to avoid the risk state, such as collision, of the vehicle and reduce damage.

[1-7-9. Driving Evaluation Unit]

The driving evaluation unit 65 may evaluate the driving tendency of each driver exhibited in a case where the driving assistance control is executed. For example, the driving evaluation unit 65 may accumulate, in the driving tendency database 69, the predicted information on the risk state and the risk level of the vehicle, the information on the traffic situation, and the information on the actually performed driving operation.

It may be estimated that the driving skill of the driver tends to be lower as an amount of the predicted information on the risk state and the risk level of the vehicle is larger. The driving tendency database 69 may contain the information on the driving skill of each driver. It may be estimated that the dependence on the driving assistance control tends to be higher, as the driver performs a deceleration or stop operation in an earlier stage to avoid the risk state in response to the information on the risk state and the risk level of the vehicle. In addition, the driving evaluation unit 65 may cause the driving tendency database 69 to accumulate various pieces of information that enable the evaluation of the driving tendency of the driver, along with the execution of the driving assistance control.

[2. Example Operation of Driving Assistance Apparatus]

Described above is the example configuration of the driving assistance apparatus according to the example embodiment. Now, an example operation of the driving assistance apparatus according to the example embodiment will be described using an instance where the vehicle collides with a bicycle or another vehicle.

FIG. 4 illustrates an instance where a vehicle 1 making a right turn at an intersection collides with a bicycle 3 that appears from behind an oncoming vehicle X and crosses a crosswalk to be approached by the vehicle 1 making the right turn. FIG. 5 illustrates an example setting of the warning and the vehicle control to be executed by the driving assistance apparatus 10 on the basis of the progression of the delay in determination and the driving tendency of the driver.

Vehicles A1, A2, and A3 indicate respective positions of the vehicle 1 at given times before the collision, and bicycles B1, B2, and B3 respectively indicate positions of the bicycle 3 at times corresponding to the positions indicated by vehicles A1, A2, and A3.

In a case where the vehicle 1 is not equipped with the driving assistance apparatus according to the example embodiment, a driver with a high driving skill level may cause the vehicle 1 to stop at the position indicated by vehicle A1, because the driver is able to predict that the own vehicle will collide with the bicycle 3 on the crosswalk upon noticing the bicycle 3 appearing from behind the oncoming vehicle X. In contrast, a driver with a low driving skill level may cause the vehicle 1 to keep traveling as is, because of being unable to predict the collision between the own vehicle and the bicycle at the position indicated by vehicle A1. A delay may occur in determining to cause the vehicle 1 to stop even at the position indicated by vehicle A2, which results in the collision with the bicycle 3 at the position indicated by vehicle A3.

In a case where the vehicle 1 is equipped with the driving assistance apparatus 10 according to the example embodiment, the traffic situation prediction unit 70 of the driving assistance apparatus 10 may recognize, at the position indicated by vehicle A1, the traffic environment including positions of the crosswalk and a lane on which the vehicle 1 is traveling, a lighting state of a traffic light, the oncoming vehicle X, and the bicycle 3. The traffic situation prediction unit 70 may thus predict that the vehicle 1 will collide with the bicycle 3 at the position of vehicle A3 if the vehicle 1 keeps traveling as is. In this case, the driving assistance control unit 90 of the driving assistance apparatus 10 may make a setting to cause the driving assistance to be executed differently depending on a frequency of encountering a near-miss incident. The encountering frequency may serve as the driving tendency of the driver. In the example illustrated in FIG. 5, no driving assistance action may be performed in a case where the driving skill of the driver is relatively high and the frequency of encountering a near-miss incident is low or middle. In contrast, in a case where the driving skill of the driver is relatively low and the frequency of encountering a near-miss incident is high, a setting may be made to cause a voice warning (suggestion) to be issued.

While the vehicle 1 travels from the position indicated by vehicle A1 to the position indicated by vehicle A2 without stopping (A1→A2), a setting may be made to cause a voice warning (suggestion) to be issued in a case where the driving skill of the driver is relatively high and the frequency of encountering a near-miss incident is low or middle. In contrast, in a case where the driving skill of the driver is relatively low and the frequency of encountering a near-miss incident is high, a setting may be made to cause the intervention in the vehicle control to be performed to reduce drive torque of the vehicle 1.

Thereafter, while the vehicle 1 travels from the position indicated by vehicle A2 to the position indicated by vehicle A3 without stopping (A2→A3), a setting may be made to cause a warning to be issued by outputting of warning sound or lighting of a warning lamp, for example, in a case where the driving skill of the driver is relatively high and the frequency of encountering a near-miss incident is low. In a case where the driving skill of the driver is relatively high and the frequency of encountering a near-miss incident is middle, a setting may be made to cause the intervention in the vehicle control to be performed to reduce the drive torque of the vehicle 1. In a case where the driving skill of the driver is relatively low and the frequency of encountering a near-miss incident is high, a setting may be made to cause the intervention in the vehicle control to be performed to generate braking force for the vehicle 1 to force the vehicle 1 to stop.

In a case where the driver's frequency of encountering a near-miss incident is low or middle, if the vehicle 1 thereafter travels to the position indicated by vehicle A3 without stopping, a setting may be made to cause the intervention in the vehicle control to be performed to generate braking force for the vehicle 1 to force the vehicle 1 to stop.

In this manner, the vehicle 1 equipped with the driving assistance apparatus 10 may, upon recognizing that the vehicle 1 can collide with the bicycle 3 at the position indicated by vehicle A3, execute an action of the vehicle 1 itself trying to avoid transition to the position indicated by vehicle A2 and subsequent positions. This makes it possible to predict collision of the vehicle 1 before the driver recognizes that, making the vehicle 1 less likely to collide. For example, in the example setting illustrated in FIG. 5, the content of the warning action and the action of intervening in the vehicle control may be set on the basis of the driver's frequency of encountering a near-miss incident, together with the progression of the delay in determination. This suppresses excessive execution of the warning action or the action of intervening in the vehicle control, making it possible to execute the warning action or the action of intervening in the traveling control without hindering smooth traveling.

In setting the content of the warning action or the action of intervening in the vehicle control, the information on the driving tendency of the driver to be used together with the progression of the delay in determination is not limited to the driver's frequency of encountering a near-miss incident. For example, FIG. 6 illustrates an example of setting the warning action or the action of intervening in the vehicle control on the basis of, together with the progression of the delay in determination, information on relative evaluation between the risk level of the vehicle evaluated by the risk level evaluator 91, and the risk level recognized when the driver him/herself has felt danger. The risk level recognized by the driver may be detected on the basis of the information transmitted from the occupant information detector 41. In this example setting, the settings of the warning action or the action of intervening in the vehicle control may be varied, depending on whether the driver has recognized a risk level equivalent to an evaluation made by the risk level evaluator 91, whether the driver is sensitive to a risk level as compared with the evaluation made by the risk level evaluator 91, or whether the driver is insensitive to a risk level as compared with the evaluation made by the risk level evaluator 91. The risk level recognized by the driver in this case is not necessarily based on the driving skill of the driver, and may appear as an index dependent on concentration on driving or wakefulness of the driver at that point in time.

FIG. 7 illustrates an example of setting the warning action or the action of intervening in the vehicle control on the basis of, together with the progression of the delay in determination, the information on the dependence of the driver on the warning action or the action of intervening in the vehicle control. The dependence on the action may be estimated on the basis of the information accumulated in the driving tendency database 69. In this example setting, levels of the dependence of the driver on the warning action or the action of intervening in the vehicle control may be classified into low, middle, and high, and the settings of the warning action or the action of intervening in the vehicle control may be varied depending on each level.

This suppresses excessive execution of the warning action or the action of intervening in the vehicle control, making it possible to execute the warning action or the action of intervening in the traveling control without hindering smooth traveling. In all of the example settings illustrated in FIG. 5 to FIG. 7, timing of starting the execution of the warning action or the action of intervening in the vehicle control may differ depending on the driving operation tendency of the driver. In one example, the timing of starting the execution of the warning action or the action of intervening in the vehicle control may be earlier, as the driver's frequency of encountering a near-miss incident is higher, as the risk level recognition by the driver is later as compared with the risk level evaluation by the vehicle, or as the dependence of the driver on the driving assistance control is higher. Note that the settings of the warning action or the action of intervening in the vehicle control in FIG. 5 to FIG. 7 are mere examples, and the action may be set as appropriate. The content of the warning action or the action of intervening in the vehicle control may be set by combining two or more of the example settings illustrated in FIG. 5 to FIG. 7.

Figure 8:
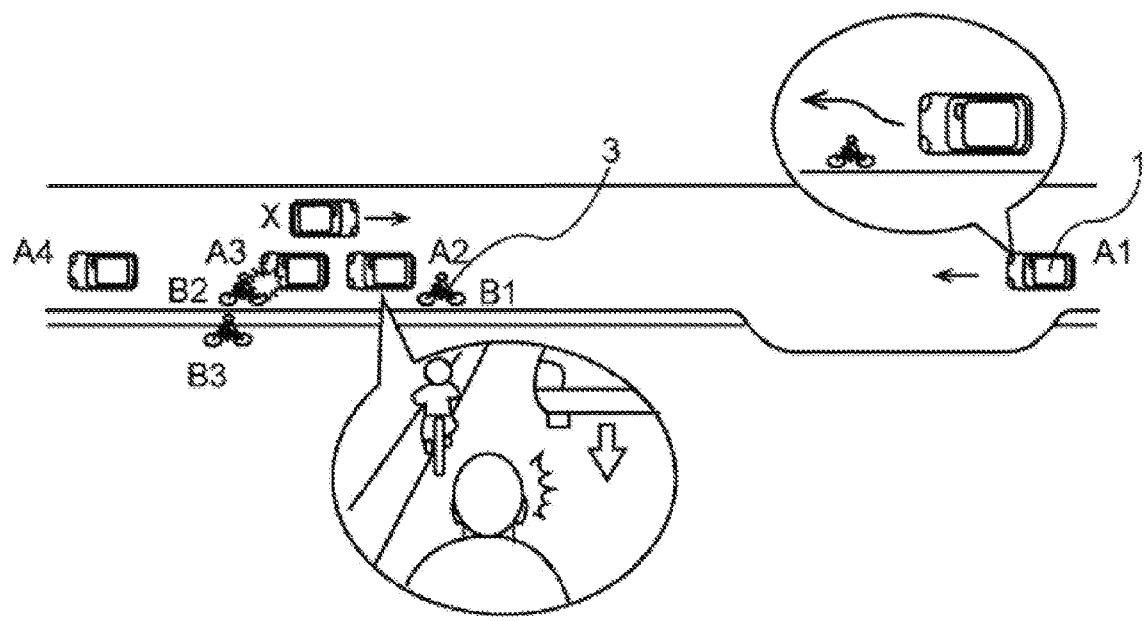
FIG. 8 is an explanatory diagram illustrating another collision instance of the vehicle.

FIG. 8 illustrates an instance where the vehicle 1 traveling on a road with a narrow width collides with the bicycle 3, when passing the bicycle 3, by trying to avoid collision with the oncoming vehicle X approaching. As in FIG. 4, vehicles A1, A2, and A3 indicate respective positions of the vehicle 1 at given times before the collision, and bicycles B1, B2, and B3 respectively indicate positions of the bicycle 3 at times corresponding to the positions indicated by vehicles A1, A2, and A3.

In a case where the vehicle 1 is not equipped with the driving assistance apparatus according to the example embodiment, a driver with a high driving skill level may cause the vehicle 1 to decelerate at the position indicated by vehicle A1, because the driver is able to predict that the own vehicle 1 will collide with the oncoming vehicle X when passing the bicycle 3, upon noticing that the oncoming vehicle X is approaching. In contrast, a driver with a low driving skill level may cause the vehicle 1 to keep traveling as is, because of being unable to predict the collision between the own vehicle 1 and the oncoming vehicle X at the position indicated by vehicle A1. A delay may occur in determining to cause the vehicle 1 to decelerate even at the position indicated by vehicle A2, which results in the collision with the bicycle 3 at the position indicated by vehicle A3.

In a case where the vehicle 1 is equipped with the driving assistance apparatus 10 according to the example embodiment, the traffic situation prediction unit 70 of the driving assistance apparatus 10 may recognize, at the position indicated by vehicle A1, the traffic environment including a position where the vehicle 1 is traveling, the oncoming vehicle X, and the bicycle 3. The traffic situation prediction unit 70 may thus predict that the vehicle 1 will collide with the oncoming vehicle if the vehicle 1 keeps traveling as is and tries to pass the bicycle 3. In this case, the driving assistance control unit 90 of the driving assistance apparatus 10 may make a setting to cause the driving assistance to be executed differently depending on the driving tendency of the driver, to avoid collision or contact of the own vehicle 1 with the oncoming vehicle X and the bicycle 3. Also in the instance illustrated in FIG. 8, the example settings illustrated in FIG. 5 to FIG. 7 may be applied.

Figure 9:
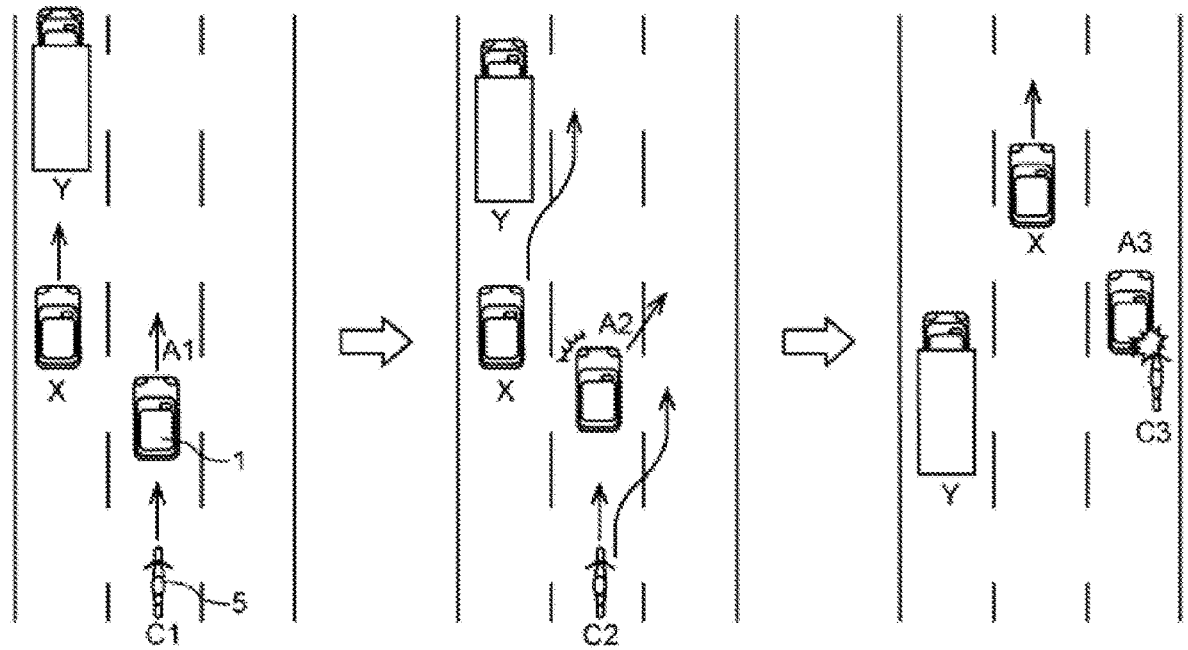
FIG. 9 is an explanatory diagram illustrating a contact instance of the vehicle.

FIG. 9 illustrates an instance where the vehicle 1 traveling on a middle lane of a three-lane road come into contact with a two-wheeled vehicle 5 trying to pass the own vehicle 1 from the rear, when the vehicle 1 makes a lane change to a right lane to avoid the other vehicle X that makes a sudden lane change from a left lane. Vehicles A1, A2, and A3 indicate respective positions of the vehicle 1 at given times before the contact, and two-wheeled vehicles C1, C2, and C3 respectively indicate positions of the two-wheeled vehicle 5 at times corresponding to the positions indicated by vehicles A1, A2, and A3.

In a case where the vehicle 1 is not equipped with the driving assistance apparatus according to the example embodiment, a driver with a high driving skill level may cause the vehicle 1 to decelerate at the position indicated by vehicle A1, because the driver is able to predict that the other vehicle X will make a lane change to the middle lane, upon noticing that a large vehicle Y is approaching in front of the other vehicle X traveling on the left lane. In contrast, a driver with a low driving skill level may cause the vehicle 1 to keep traveling as is, because of being unable to predict the lane change of the other vehicle X. A delay may occur in noticing that the two-wheeled vehicle 5 is performing a passing action from the rear, even at the position indicated by vehicle A2, which results in the contact with the two-wheeled vehicle 5 at the position indicated by vehicle A3.

In a case where the vehicle 1 is equipped with the driving assistance apparatus 10 according to the example embodiment, the traffic situation prediction unit 70 of the driving assistance apparatus 10 may recognize, at the position indicated by vehicle A1, the traffic environment including the position where the vehicle 1 is traveling, the other vehicles X and Y, and the two-wheeled vehicle 5. The traffic situation prediction unit 70 may thus predict that the vehicle 1 will collide with the other vehicle X making a lane change from the left lane if the vehicle 1 keeps traveling as is. In this case, the driving assistance control unit 90 of the driving assistance apparatus 10 may make a setting to cause the driving assistance to be executed differently depending on the driving tendency of the driver, to avoid collision or contact of the own vehicle 1 with the other vehicle X and the two-wheeled vehicle 5. Also in the instance illustrated in FIG. 9, the example settings illustrated in FIG. 5 to FIG. 7 may be applied.

[3. Control Process Performed by Driving Assistance Apparatus]

Figure 10:
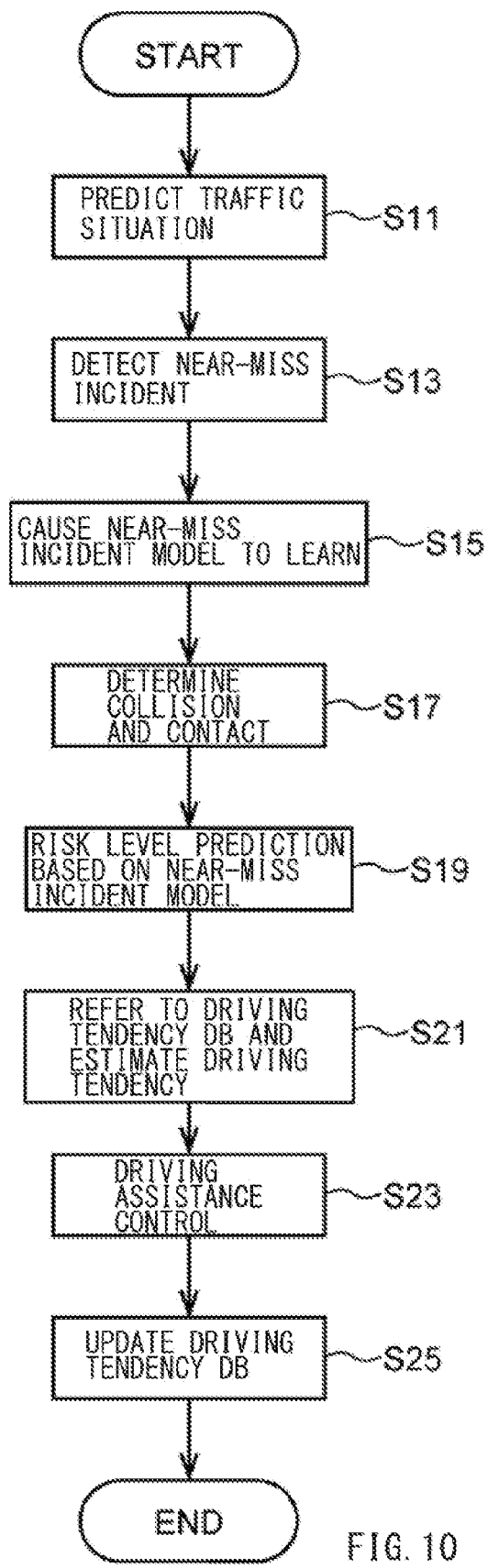
FIG. 10 is a flowchart illustrating an example operation of the driving assistance apparatus according to one example embodiment of the technology.
Figure 11:
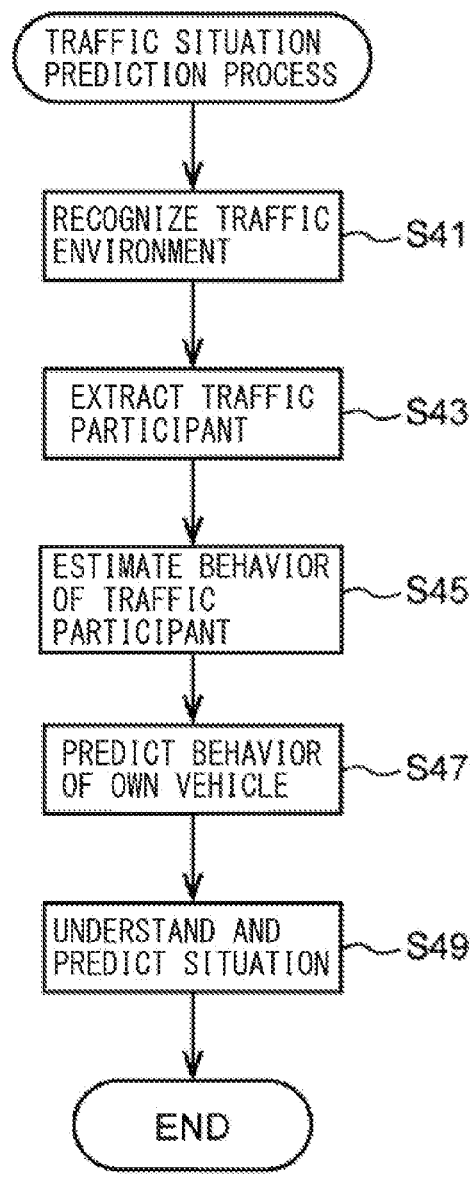
FIG. 11 is a flowchart illustrating a traffic situation prediction process.
Figure 12:
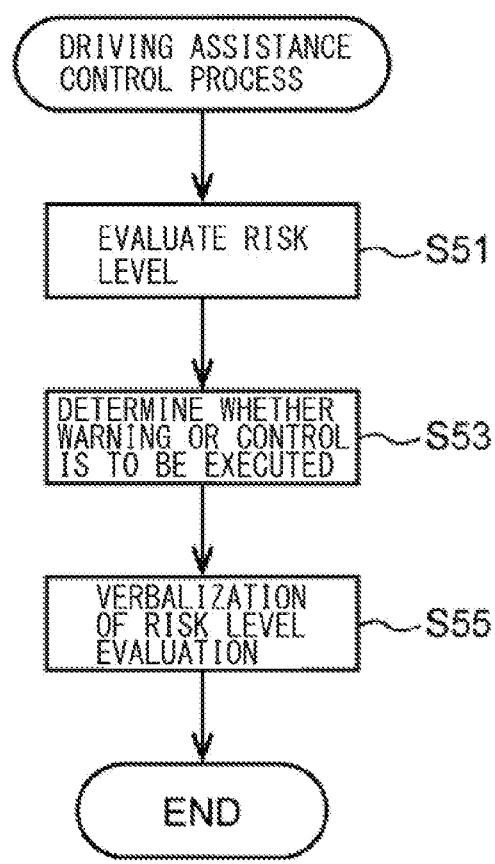
FIG. 12 is a flowchart illustrating a driving assistance control process.

Now, description will be given on a control process to be executed by the driving assistance apparatus according to the example embodiment, with reference to flowcharts illustrated in FIG. 10 to FIG. 12. FIG. 10 is a flowchart illustrating an overall flow of a control process performed by the driving assistance apparatus 10. FIG. 11 is a flowchart illustrating a flow of a traffic situation prediction process performed by the traffic situation prediction unit 70. FIG. 12 is a flowchart illustrating a flow of a driving assistance control process performed by the driving assistance control unit 90. The control process illustrated in these flowcharts may be executed constantly while a system of the vehicle 1 is in operation, or may be executed after an input to start the action of the driving assistance control is received.

First, the traffic situation prediction unit 70 may predict the traffic situation where the vehicle 1 is to be placed (step S11). For example, as illustrated in FIG. 11, the traffic environment recognizer 71 may obtain the information on the environment around the vehicle 1, on the basis of the information transmitted from the surrounding information detector 43 (step S41). Thereafter, the traffic participant extractor 73 may extract a traffic participant, such as another vehicle, a pedestrian, or a bicycle, present around the vehicle 1, on the basis of the information transmitted from the surrounding information detector 43 (step S43). Thereafter, the traffic participant behavior estimating section 75 may input the information on the extracted traffic participant to the behavior learning model 79, and estimate the behavior of each traffic participant on the basis of an output from the behavior learning model 79 (step S45). Thereafter, the own vehicle behavior predicting section 77 may predict the behavior of the own vehicle 1, on the basis of the traveling state information of the vehicle 1 detected by the vehicle information detector 45 and the operation state information of the vehicle 1 detected by the operation information detector 47 (step S47). Thereafter, the traffic situation understanding and predicting section 81 may understand and predict the traffic situation of the own vehicle 1 by taking into consideration the behavior of the traffic participant and the behavior of the own vehicle, in addition to the traffic environment around the own vehicle (step S49). In this manner, the traffic situation prediction unit 70 may predict the traffic situation where the own vehicle 1 is to be placed.

Thereafter, the near-miss incident detection unit 51 may detect a near-miss incident indicating a state in which the occupant of the vehicle 1 has felt danger (step S13). In one example, the near-miss incident detection unit 51 may acquire information to be used to estimate an emotion or sensitivity of the occupant of the vehicle 1, on the basis of the information transmitted from the occupant information detector 41, and detect the near-miss incident on the basis of such information. For example, the near-miss incident detection unit 51 may detect the near-miss incident, in a case where an abrupt change occurs in the pulse rate, heart rate, blood pressure, or electrocardiogram, for example, in a state of having detected that the occupant is looking outside the vehicle on the basis of the information on the face direction and line of sight. In another example, the near-miss incident detection unit 51 may detect the near-miss incident in a case where an abrupt change occurs in the pulse rate, heart rate, blood pressure, or electrocardiogram, for example, upon detecting that the occupant has returned from a looking-aside state to a state of a proper line of sight, after detecting that the occupant is looking aside on the basis of the information on the face direction and line of sight.

Thereafter, the near-miss incident detection unit 51 may input, to the near-miss incident learning model 53, data on the traffic situation where the vehicle 1 has been placed upon the detection of the near-miss incident, to cause the near-miss incident learning model 53 to sequentially learn to be updated (step S15). The occupant to be a target of detection of the near-miss incident is not limited to the driver, and may include a passenger.

Thereafter, the collision and contact determination unit 57 may determine whether collision or contact of the vehicle 1 occurs, on the basis of the traffic situation predicted by the traffic situation prediction unit 70, by using the physical model (step S17). In one example, the collision and contact determination unit 57 may determine, on the basis of the physical model, whether the path of the course to be taken by the traffic participant and the path of the course to be taken by the own vehicle meet each other, on the basis of the current traffic environment, the predicted behavior of the traffic participant, and the predicted behavior of the own vehicle.

Thereafter, the risk prediction unit 55 may predict the risk level of the vehicle 1, on the basis of the traffic situation predicted by the traffic situation prediction unit 70, by using the near-miss incident learning model 53 (step S19). In one example, the risk prediction unit 55 may input data indicating the traveling state information and the surrounding environment information of the vehicle to the near-miss incident learning model 53, and predict the risk state of the own vehicle on the basis of the outputted near-miss incident state. In a case where the output from the near-miss incident learning model 53 indicates that a near-miss incident has been detected in the past, the risk prediction unit 55 may predict that the predicted traffic situation is a state involving a risk for the own vehicle.

The risk prediction unit 55 may objectively predict the risk state of the vehicle 1 from the current traffic situation, on the basis of instances where the occupant of the vehicle has actually felt danger in the past. This makes it possible to predict occurrence of collision, for example, of the vehicle 1, even at a point in time when the degree of certainty of the physical-model-based determination of occurrence of collision, for example, by the collision and contact determination unit 57 is low.

Thereafter, the driving tendency estimation unit 59 may refer to the driving tendency database 69, and estimate the driving tendency of the driver in the predicted traffic situation (step S21). In one example, the driving tendency estimation unit 59 may refer to the driving tendency database 69, and estimate how often the driver him/herself has felt danger in the past in the current traffic situation or the dependence of the driver him/herself on the driving assistance control, for example. This enables estimation of the driving skill of the driver, or effectiveness, for example, of the driving assistance control to be executed, making it possible to change a degree of the warning action or the action of intervening in the vehicle control.

Thereafter, the driving assistance control unit 90 may execute the driving assistance control on the basis of the predicted risk level (step S23). In the driving assistance apparatus 10 according to the example embodiment, the driving assistance control unit 90 may execute at least one of the warning control or the vehicle control, on the basis of the information transmitted from the occupant information detector 41, and the information obtained by the risk prediction unit 55, the collision and contact determination unit 57, and the driving tendency estimation unit 59. For example, as illustrated in FIG. 12, the risk level evaluator 91 may comprehensively evaluate the risk level of the own vehicle, on the basis of the risk state prediction result obtained by the collision and contact determination unit 57 and based on the physical model, and the risk state prediction result obtained by the risk prediction unit 55 and based on the near-miss incident learning model (step S51).

Thereafter, the warning or control execution determining section 95 may determine whether the warning control or the vehicle control is to be executed, on the basis of the risk level evaluation result (step S53). As illustrated in FIG. 5 to FIG. 7, in the driving assistance apparatus 10 according to the example embodiment, the warning or control execution determining section 95 may set the content of the warning action or the action of intervening in the vehicle control, on the basis of the progression of the delay in determination and the information on the driving tendency of the driver. In one example, the warning or control execution determining section 95 may set the content of the warning action or the action of intervening in the vehicle control such that the degree of intervention in the vehicle control is higher as the delay in determination further progresses, as the driving skill of the driver is lower, or as the dependence of the driver on the driving assistance control is larger.

In a case where the warning device 31 is a device that produces voice or displays text, the risk level evaluation verbalizing section 93 may perform verbalization for warning issuance to the occupant (step S55). The warning control unit 61 or the vehicle control unit 63 may thus generate a control signal for the warning device 31 or the vehicle control device 33, on the basis of the set warning action and action of intervening in the vehicle control. This makes it possible to prompt the driver to perform a driving operation of avoiding the risk state of the vehicle 1, or cause the vehicle 1 to automatically decelerate or stop, making it possible to avoid the risk state, such as collision, of the vehicle 1, and reduce damage.

Thereafter, the driving evaluation unit 65 may accumulate, in the driving tendency database 69, the information on the risk state and the risk level of the vehicle 1 predicted by various calculations, and the information on the actually performed driving operation, to update the driving tendency database 69 (step S25). This enables accumulation of the information indicating the driving tendency of each driver, and improves estimation accuracy of the driving tendency by the driving tendency estimation unit 59, making it possible to execute the driving assistance control, without hindering smooth traveling, depending on the driving skill of the driver.

As described above, in the driving assistance apparatus 10 according to the example embodiment, the risk level of the vehicle 1 is evaluated on the basis of the risk state, such as collision, of the vehicle 1 predicted on the basis of the near-miss incident learning model 53 constructed by learning the traffic situation where the occupant of the vehicle has felt danger in the past, as well as the risk state, such as collision, of the vehicle 1 determined on the basis of the physical model on the basis of the predicted behavior of the own vehicle 1 and behavior of the traffic participant around the own vehicle 1. Thus, even in a situation where the degree of certainty of the determination based on the physical model is low, it is possible to perform risk prediction based on objective data on the traffic environment, making it possible to start the warning action or the action of intervening in the vehicle control at earlier timing. This makes it possible to prompt the driver to perform an avoidance operation, and cause the vehicle 1 to autonomously perform an action of avoiding the risk state. Accordingly, in at least one embodiment of the technology, even in a case where a plurality of targets is present, it is possible to execute a warning action or an action of intervening in traveling control, without hindering smooth traveling.

In the driving assistance apparatus 10 according to the example embodiment, the degree of the warning or the intervention in the vehicle control may be made larger depending on the progression of the delay in determination before a time at which collision, for example, of the vehicle 1 is assumed to occur. This suppresses excessive execution of the warning action or the action of intervening in the vehicle control, making it possible to execute the warning action or the action of intervening in the traveling control without hindering smooth traveling.

In the driving assistance apparatus 10 according to the example embodiment, the degree of the warning or the intervention in the vehicle control may be changed depending on the driving tendency of the driver, as well as the progression of the delay in determination by the driver. Thus, the degree of the warning or the intervention in the vehicle control may differ depending on the driving skill of each driver or the dependence on the driving assistance control, making it possible to execute the warning action or the action of intervening in the traveling control without hindering smooth traveling.

In the above description, some example embodiments and modification examples of the technology are described in detail with reference to the accompanying drawings. However, it should be appreciated that the example embodiments of the technology described above are merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

For example, although an example in which all elements of the driving assistance apparatus 10 are mounted in the vehicle has been described in the example embodiment described above, the technology is not limited to this example. A part of functions of the driving assistance apparatus 10 may be provided in a device outside the vehicle, and this device may be configured to communicate with the electronic control device mounted in the vehicle. For example, at least one of the behavior learning model, the near-miss incident learning model, or the driving tendency database may be stored in a device outside the vehicle, and the electronic control device and the device outside the vehicle may be configured to communicate with each other via a wireless communication network, such as mobile communication.

Each of the near-miss incident detection unit 51, the risk prediction unit 55, and the driving assistance control unit 90 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the near-miss incident detection unit 51, the risk prediction unit 55, and the driving assistance control unit 90. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the near-miss incident detection unit 51, the risk prediction unit 55, and the driving assistance control unit 90 illustrated in FIG. 1.

The invention claimed is:

1. A driving assistance apparatus comprising:
a collision determining device configured to predict an occurrence of a collision of the vehicle on a basis of traveling state information of the vehicle and surrounding environment information of the vehicle;
a driving assistance control device configured to, when the collision determining device predicts the occurrence of the collision, execute first driving assistance control to avoid the collision, the first driving assistance control includes at least one execution of deceleration of the vehicle or execution of turning of the vehicle;
a detection device configured to acquire biological information of an occupant of the vehicle, and detect that the occupant feels danger on a basis of the biological information; and
a first data storage device configured to store a learning model constructed by accumulating the traveling state information of the vehicle and the surrounding environment information of the vehicle each obtained when the occupant feels the danger; and
a risk prediction device configured to predict the occurrence of the collision of the vehicle on a basis of the learning model, the traveling state information of the vehicle and the surrounding environment information of the vehicle,
wherein the driving assistance control device is configured to, when the risk prediction device predicts the occurrence of the collision while the collision determining device has not predict the occurrence of the collision, execute second driving assistance control to avoid the collision, the second driving assistance control includes at least one of execution of warning to the occupant, execution of deceleration of the vehicle or execution of turning of the vehicle.

2. The driving assistance apparatus according to claim 1, further comprising a second data storage device configured to accumulate data on a driving operation tendency of a driver of the vehicle exhibited in a case where the second driving assistance control is executed, wherein the driving assistance control device is configured to execute the driving assistance control further on a basis of the data on the driving operation tendency of the driver.

3. The driving assistance apparatus according to claim 2, wherein
the second data storage device is configured to accumulate, as the data on the driving operation tendency of the driver, at least one piece of data, out of data on how often the occupant feels the danger, data on a driving operation performed when the occupant feels the danger, data on a risk level recognized when the occupant feels the danger, and data on a driving skill of the driver, and
the driving assistance control device is configured to set a content of the second driving assistance control on a basis of the at least one piece of data.

4. The driving assistance apparatus according to claim 2, wherein the driving assistance control device is configured to set timing of executing the second driving assistance control, on the basis of the data on the driving operation tendency of the driver.

5. The driving assistance apparatus according to claim 3, wherein the driving assistance control device is configured to set timing of executing the second driving assistance control, on the basis of the data on the driving operation tendency of the driver.

6. The driving assistance apparatus according to claim 1, wherein the driving assistance control device is configured to set a content of the second driving assistance control on a basis of elapsed time from a time when the risk prediction device predicts the occurrence of the collision.

7. The driving assistance apparatus according to claim 2, wherein the driving assistance control device is configured to set a content of the second driving assistance control on a basis of elapsed time from a time when the risk prediction device predicts the occurrence of the collision.

8. The driving assistance apparatus according to claim 3, wherein the driving assistance control device is configured to set a content of the second driving assistance control on a basis of elapsed time from a time when the risk prediction device predicts the occurrence of the collision.

9. The driving assistance apparatus according to claim 4, wherein the driving assistance control device is configured to set a content of the second driving assistance control on a basis of elapsed time from a time when the risk prediction device predicts the occurrence of the collision.

10. The driving assistance apparatus according to claim 5, wherein the driving assistance control device is configured to set a content of the second driving assistance control on a basis of elapsed time from a time when the risk prediction device predicts the occurrence of the collision.

11. The driving assistance apparatus according to claim 1, wherein the driving assistance control device is configured to set a content of the second driving assistance control on a basis of concentration or wakefulness of a driver of the vehicle.

12. The driving assistance apparatus according to claim 2, wherein the driving assistance control device is configured to set a content of the second driving assistance control on a basis of concentration or wakefulness of a driver of the vehicle.

13. The driving assistance apparatus according to claim 3, wherein the driving assistance control device is configured to set a content of the second driving assistance control on a basis of concentration or wakefulness of a driver of the vehicle.

14. The driving assistance apparatus according to claim 4, wherein the driving assistance control device is configured to set a content of the second driving assistance control on a basis of concentration or wakefulness of a driver of the vehicle.

15. The driving assistance apparatus according to claim 5, wherein the driving assistance control device is configured to set a content of the second driving assistance control on a basis of concentration or wakefulness of a driver of the vehicle.

16. A driving assistance apparatus comprising:
   a processor configured to:
      execute a first prediction to predict an occurrence of a collision of the vehicle on a basis of a traveling state information of the vehicle and surrounding environment information of the vehicle,
      execute first driving assistance control to avoid the collision on a basis of the first estimated time of collision, the first driving assistance control includes at least one of execution of deceleration of the vehicle or execution of turning of the vehicle,
      acquire biological information of an occupant of the vehicle, and
      detect that the occupant feels danger on a basis of the biological information; and
   a first data storage configured to store a learning model constructed by accumulating the traveling state information of the vehicle and the surrounding environment information of the vehicle each obtained when the occupant feels the danger,
   wherein the circuitry is configured to execute a second prediction to predict the occurrence of the collision of the vehicle on a basis of the learning model, the traveling state information of the vehicle and the surrounding environment information of the vehicle,
   wherein the circuitry is configured to, when the occurrence of the collision is predicted by the second prediction and the occurrence of the collision is not predicted by the first prediction, execute second driving assistance control to avoid the collision, the second driving assistance control includes at least one of execution of warning to the occupant, execution of deceleration of the vehicle or execution of turning of the vehicle.

* * * * *